United States Patent
Klaassen et al.

(10) Patent No.: US 9,586,452 B2
(45) Date of Patent: Mar. 7, 2017

(54) CHASSIS COMPONENT COMPRISING A STOP FOR AN ECCENTRIC DISC

(71) Applicant: Autotech Engineering Deutschland GmbH, Bielefeld (DE)

(72) Inventors: Denis Klaassen, Bad Rothenfelde (DE); Mario Krolo, Steinhagen (DE); David Montejo, Leioa (ES)

(73) Assignee: Autotech Engineering Deutschland GmbH, Bielefeld (DE)

( * ) Notice: Subject to any disclaimer, the term of this patent is extended or adjusted under 35 U.S.C. 154(b) by 1 day.

(21) Appl. No.: 14/623,061

(22) Filed: Feb. 16, 2015

(65) Prior Publication Data
US 2015/0231940 A1 Aug. 20, 2015

(30) Foreign Application Priority Data
Feb. 20, 2014 (EP) .................................. 14155903

(51) Int. Cl.
*B60G 7/02* (2006.01)
*B60G 7/00* (2006.01)
*F16B 5/02* (2006.01)

(52) U.S. Cl.
CPC ........ *B60G 7/008* (2013.01); *B60G 2204/143* (2013.01); *B60G 2204/4302* (2013.01); *B60G 2204/61* (2013.01); *B60G 2206/10* (2013.01); *B60G 2206/601* (2013.01); *F16B 5/0225* (2013.01)

(58) Field of Classification Search
CPC ................ B60G 7/008; B60G 2206/10; B60G 2204/143; B60G 2204/61; B60G 2204/4302; B60G 2206/601; F16B 5/0225

USPC ................................................... 280/124.116
See application file for complete search history.

(56) References Cited

U.S. PATENT DOCUMENTS

| | | | | |
|---|---|---|---|---|
| 4,733,884 A * | 3/1988 | Pettibone | ............... | B60G 7/001 |
| | | | | 280/86.753 |
| 5,897,139 A * | 4/1999 | Aloe | ........................ | B60G 7/02 |
| | | | | 280/781 |
| 6,352,272 B1 * | 3/2002 | Lee | ........................ | B60G 7/001 |
| | | | | 280/124.125 |
| 7,584,815 B2 * | 9/2009 | Ogawa | ..................... | B60G 3/20 |
| | | | | 180/312 |

(Continued)

FOREIGN PATENT DOCUMENTS

| DE | 102012011797 A1 | 1/2013 |
|---|---|---|
| WO | 2013110528 A1 | 8/2013 |

*Primary Examiner* — Karen Beck
(74) *Attorney, Agent, or Firm* — The Webb Law Firm

(57) ABSTRACT

The invention relates to a chassis component having a mount which is produced from a formable basic material and includes at least one slot for receiving a connection bolt for connecting a steering arm and at least one stop for an eccentric disc which is or can be connected in a torsionally stiff sense to the connection bolt. In order for it to be possible to produce the stop for the eccentric disc in a reliable and cost-effective manner without the risk of crack formation, the invention provides for a recess to be molded into the basic material, which recess defines a peripheral edge region and a base enclosed by the edge region, the base including the slot and the edge region including two oblong surfaces extending in parallel with one another which act as the stop for the eccentric disc.

18 Claims, 4 Drawing Sheets

(56) References Cited

U.S. PATENT DOCUMENTS

| | | | |
|---|---|---|---|
| 8,226,091 B2* | 7/2012 | Lee | B60G 7/006 |
| | | | 280/5.52 |
| 2007/0084693 A1* | 4/2007 | Byers | A63H 17/262 |
| | | | 192/66.1 |
| 2008/0036167 A1* | 2/2008 | Svartz | B60G 7/006 |
| | | | 280/124.116 |
| 2013/0147134 A1* | 6/2013 | Lee | B60G 7/006 |
| | | | 280/5.52 |
| 2013/0193660 A1 | 8/2013 | Ramsey et al. | |
| 2014/0117654 A1 | 5/2014 | Buschjohann et al. | |
| 2014/0131971 A1* | 5/2014 | Hou | B60G 3/26 |
| | | | 280/124.128 |
| 2015/0231940 A1* | 8/2015 | Klaassen | B60G 7/008 |
| | | | 280/124.116 |

* cited by examiner

CHASSIS COMPONENT COMPRISING A STOP FOR AN ECCENTRIC DISC

CROSS-REFERENCE TO RELATED APPLICATION

This application claims priority to European Patent Application No. 14155903.9 filed Feb. 20, 2014, the disclosure of which is hereby incorporated in its entirety by reference.

BACKGROUND OF THE INVENTION

Field of the Invention

The invention relates to a chassis component having a mount which is produced from a formable basic material, preferably sheet steel and comprises at least one slot for receiving a connection bolt for connecting a steering arm and at least one stop for an eccentric disc which is or can be connected in a torsionally stiff sense to the connection bolt.

Description of Related Art

Chassis components of this type, for example rear axle beams, are provided on the mounts for connecting steering arms, in particular spring links and track rods for example, with means for setting the track and camber of the chassis wheels. Said means usually comprise an eccentric disc which is connected in a torsionally stiff sense to the connection bolt for connecting the steering arm, the eccentric disc being assigned a stop on which it rolls or slides when the connection bolt is adjusted in order to set the track and camber.

In the prior art, the stop for the eccentric disc is formed by at least one supplementary element, for example a U-shaped sheet metal part, which is welded on, or by slotted openings. However, these known solutions are not satisfactory. In the case of the slotted openings, there is a risk of unintentional crack formation and crack propagation in the basic material of the chassis component. Moreover, it is relatively complex to comply with the maximum permissible tolerances with regard to the shape and the dimensions of the slotted openings. In addition, it is possible, namely when tightening the screw connection, that indentations are formed on the slotted openings, and therefore the stop function is lost.

Forming the eccentric stop by welding on a supplementary element entails additional material costs and significant process costs due to the additional production step of welding. Moreover, there is sometimes the risk of the supplementary element becoming detached if the welded joint is poorly produced and/or if it is subjected to corrosion.

Proceeding from the above, the object of the invention was to produce a chassis component of the type mentioned at the outset, the eccentric disc stop of which can be produced in a reliable and cost-effective manner without the risk of crack formation.

SUMMARY OF THE INVENTION

The chassis component according to the invention, which comprises a mount produced from a formable basic material, preferably sheet steel, and has at least one slot for receiving a connection bolt for connecting a steering arm and at least one stop for an eccentric disc which is or can be connected in a torsionally stiff sense to the connection bolt, is characterised in that a recess is moulded into the basic material and defines a peripheral edge region and a base enclosed by the edge region, the base comprising the slot and the edge region comprising two oblong surfaces which extend in parallel with one another and act as the stop for the eccentric disc.

The recess can be produced with a relatively low degree of deformation of the basic material. Due to the low degree of deformation, crack formation can be reliably avoided. The recess can also be reliably moulded, in particular stamped, into high-strength steel sheets. The maximum permissible tolerances can be reliably adhered to due to just one single recess being moulded. Preferably, the moulding (stamping) of the recess and the subsequent forming of the slot are performed concentrically. It is possible, in particular, to form the slot by means of a punch integrated in the forming tool, so that the recess is moulded and the slot made essentially in one production step. In particular, the solution according to the invention does not require any supplementary element which is to be welded onto the basic material, since the eccentric disc stop according to the invention is moulded from the basic material. In comparison with the conventional solution, in which the supplementary elements are welded on as a stop, these additional material costs are not incurred in the solution according to the invention.

A preferred configuration of the solution according to the invention is characterised in that each of the two oblong surfaces of the recess, which extend in parallel with one another, enclose an angle with the base of said recess which is in the range of from 90° to 120°, preferably in the range of from 90° to 100°. The two oblong surfaces, extending in parallel with one another, are preferably each formed substantially perpendicularly on the base of the recess. Thus, an eccentric disc having a cylindrical, preferably a circular cylindrical, peripheral edge can be used as the eccentric disc. An eccentric disc of this type is relatively simple to produce and can therefore be obtained in a cost-effective manner.

Preferably each of the two oblong surfaces (stop surfaces), extending in parallel with one another, extend perpendicularly, when viewed relative to the base (or in the z-direction), over at least 10%, preferably at least 20%, more preferably at least 25% of the depth of the recess.

A further preferred configuration of the solution according to the invention is characterised in that the greatest depth of the recess is less than 3.0 times, preferably less than 2.8 times, the thickness of the basic material. This configuration contributes to a very low degree of deformation of the basic material and thus increases the protection against crack formation. Alternatively or in addition, the depth of the recess of the chassis component according to the invention is determined according to the thickness of the eccentric disc, such that the depth of the recess is then, for example, 0.5 times to 1.2 times the thickness of the eccentric disc.

According to a further preferred configuration of the invention, each of the two oblong surfaces, extending in parallel with one another, has a length which is at least 0.8 times, preferably at least 1.1 times, the length of the slot. A sufficiently large adjustment region for the steering bar connection for setting the track and camber can thereby be achieved with a low degree of deformation of the basic material.

With regard to small dimensions of the recess and a low degree of deformation of the basic material, it is further advantageous if, according to a further preferred configuration of the invention, each of the two oblong surfaces (stop surfaces) extending in parallel with one another transitions into the base of the recess with a transition radius of less than 1.0 mm, preferably less than 0.6 mm.

A further advantageous configuration of the invention is characterised in that the peripheral edge region comprises two arcuate edge regions which transition into the two oblong surfaces extending in parallel with one another and comprise curved flanks in a sectional plane extending perpendicularly to the longitudinal axis of the slot, each of the flanks comprising a concave flank portion beginning at the base of the recess and a convex flank portion connected thereto and ending at the outer peripheral line of the peripheral edge region. The arcuate edge portions and the curved flanks thereof only require a relatively small amount of stretching or compression of the basic material when moulding the recess and thus contribute significantly to the prevention of crack formation. Preferably, the recess is formed in such a way that the convex flank portion has a curve length which is at least 20%, more preferably at least 80%, longer than that of the concave flank portion. Preferably, the flank section is formed on the two arcuate edge portions in such a way that the maximum possible inclination gradient of the entire flank section is as low as possible there.

With regard to simple assembly and adjustment of the eccentric disc, it is advantageous if, according to a further configuration of the invention, the concave flank portion begins at a distance from the longitudinal axis of the slot which is greater than the length of the slot.

BRIEF DESCRIPTION OF THE DRAWINGS

In the following, the invention will be described in greater detail with reference to drawings showing an embodiment, in which drawings.

DETAILED DESCRIPTION OF THE INVENTION

Figure 1:
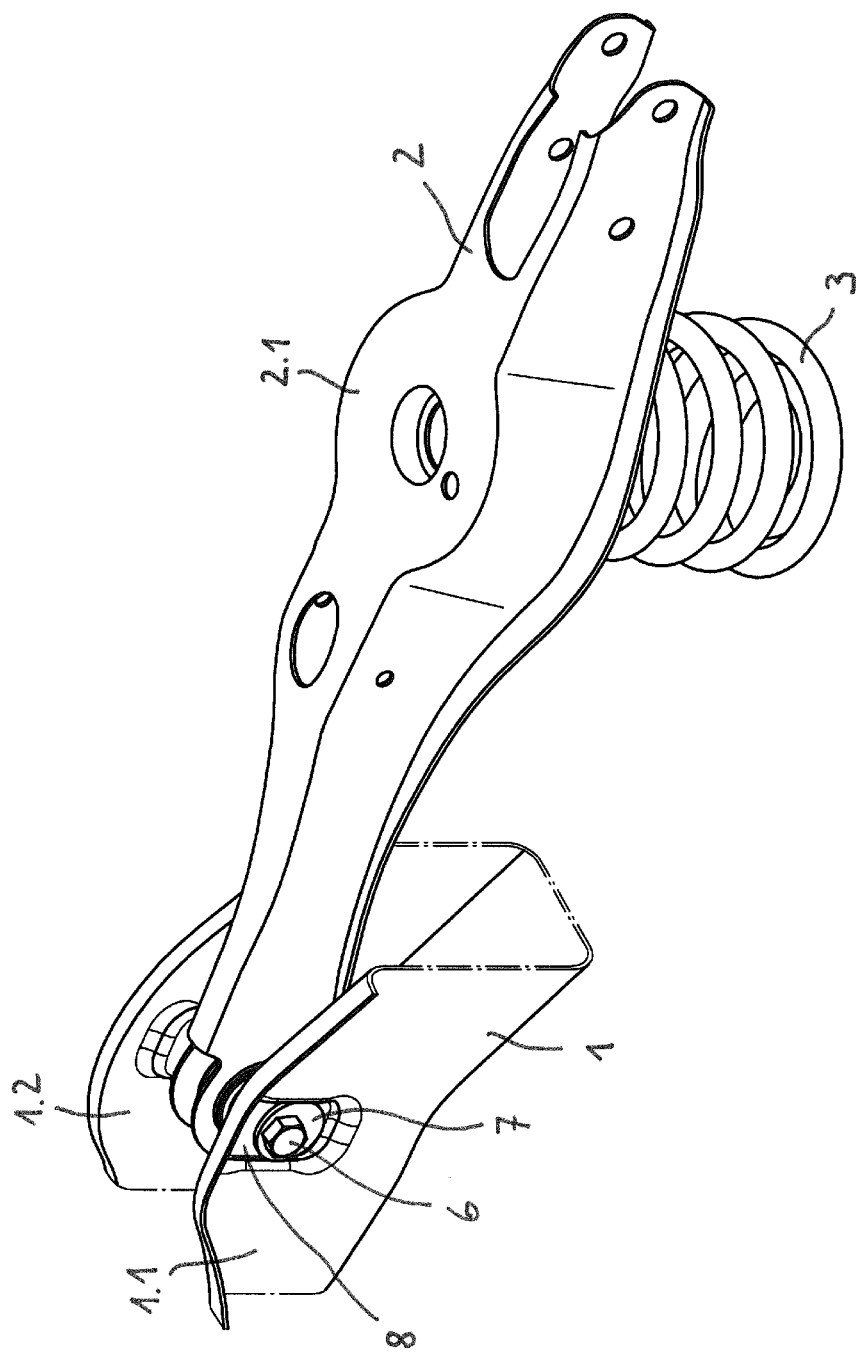
FIG. 1 is a perspective view of a portion of a rear axle beam comprising a spring link movably mounted thereon.
Figure 2:
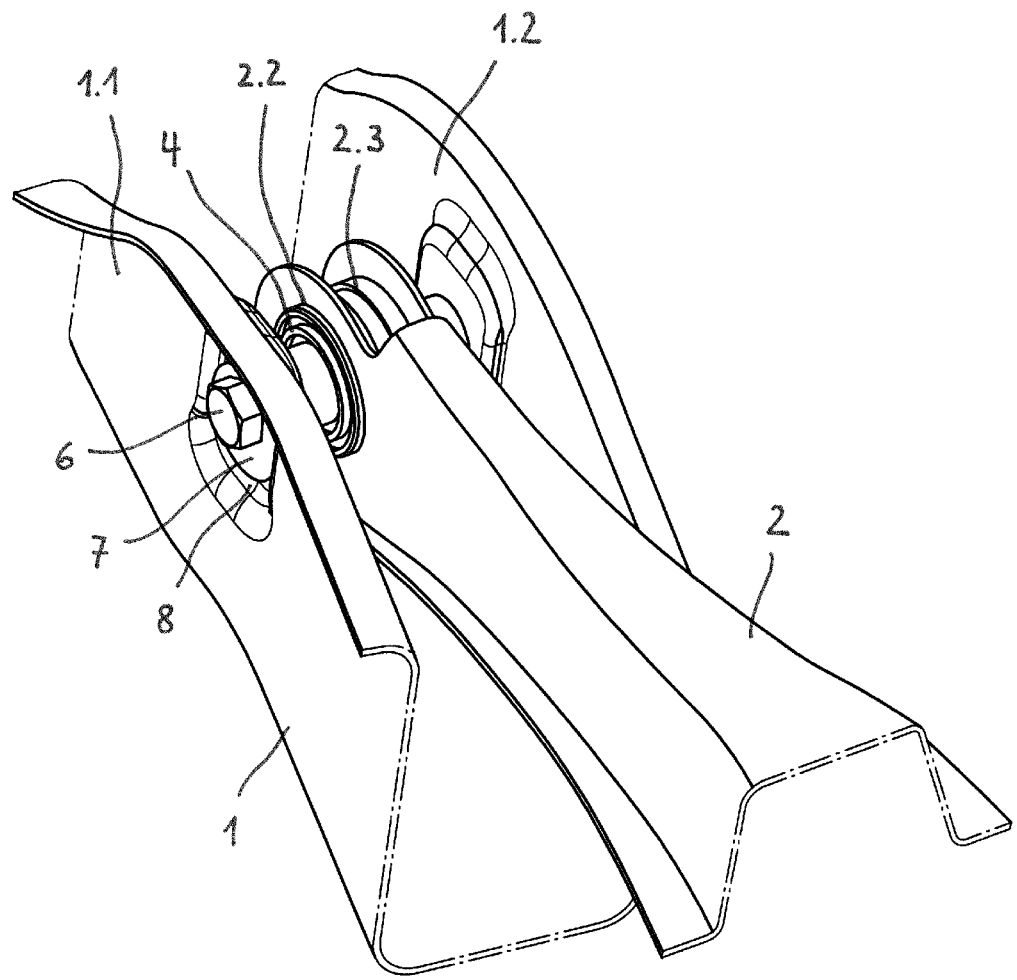
FIG. 2 shows the portion of the rear axle beam of FIG. 1, together with a portion of the spring link movably attached thereto, in a perspective view which is enlarged compared with FIG. 1.

FIG. 1 shows a portion of a rear axle beam 1, on which a steering arm 2 for suspending a vehicle wheel is movably mounted. The steering arm (control arm) 2 is formed as a spring link and accordingly has a portion 2.1 having an enlarged diameter for receiving and supporting a helical spring 3. The rear axle beam 1 is formed of sheet metal, preferably sheet steel, which is shaped accordingly. Said beam is preferably produced from high-strength steel, in particular multiphase- or complex phase steel, which has a tensile strength of at least 800 MPa and a yield strength of at least 680 MPa for example.

The sheet thickness of the rear axle beam 1 is for example in the range of from 1.5 to 3.5 mm, preferably in the range of from 1.5 to 2.5 mm.

The end of the steering arm (control arm) 2 connected to the rear axle beam 1 comprises two bearing eyes 2.2, 2.3 which are aligned with one another and in which a bearing bush 4 is held in an interlocking manner. The bearing bush 4 is preferably a rubber-metal bush.

The rear axle beam 1 has a substantially U-shaped cross section, at least in the region of the steering arm connection. The edges of the legs 1.1, 1.2 of said beam are preferably bended outwards in this case. Through-holes 5 are formed in the legs 1.1, 1.2, which holes align with one another and are formed as slots. A connection bolt 6 is inserted through the slots 5 of the rear axle beam leg and the bearing bush 4 of the steering arm 2 arranged therebetween. The camber of the associated vehicle wheel, i.e. the inclination of the wheel plane to the vertical, and the track of the vehicle wheels can be set via the steering arm 2 by means of adjusting, in particular sliding, the connection bolt 6 along the longitudinal axis of the slots 5. For this purpose, the connection bolt 6 is provided with an eccentric disc 7 which is connected therewith in a torsionally stiff sense. The connection bolt 6 comprises, for example, a longitudinal groove (not shown), in which the annular eccentric disc 7 engages in an interlocking manner via a projection protruding radially inwards at the through-opening thereof.

Two surfaces 8.1, 8.2, extending in parallel with one another, of a recess 8 moulded into the basic material (sheet metal) of the rear axle beam act as a stop for the eccentric disc 7. The depth or greatest depth T of the recess 8 is, for example, less than 3.0 times, preferably less than 2.8 times, the thickness d of the basic material.

Furthermore, the depth T of the recess 8 is preferably also determined according to the thickness of the eccentric disc 7, such that the depth T of the recess is then, for example, 0.5 times to 1.2 times the thickness of the eccentric disc 7.

Figure 3:
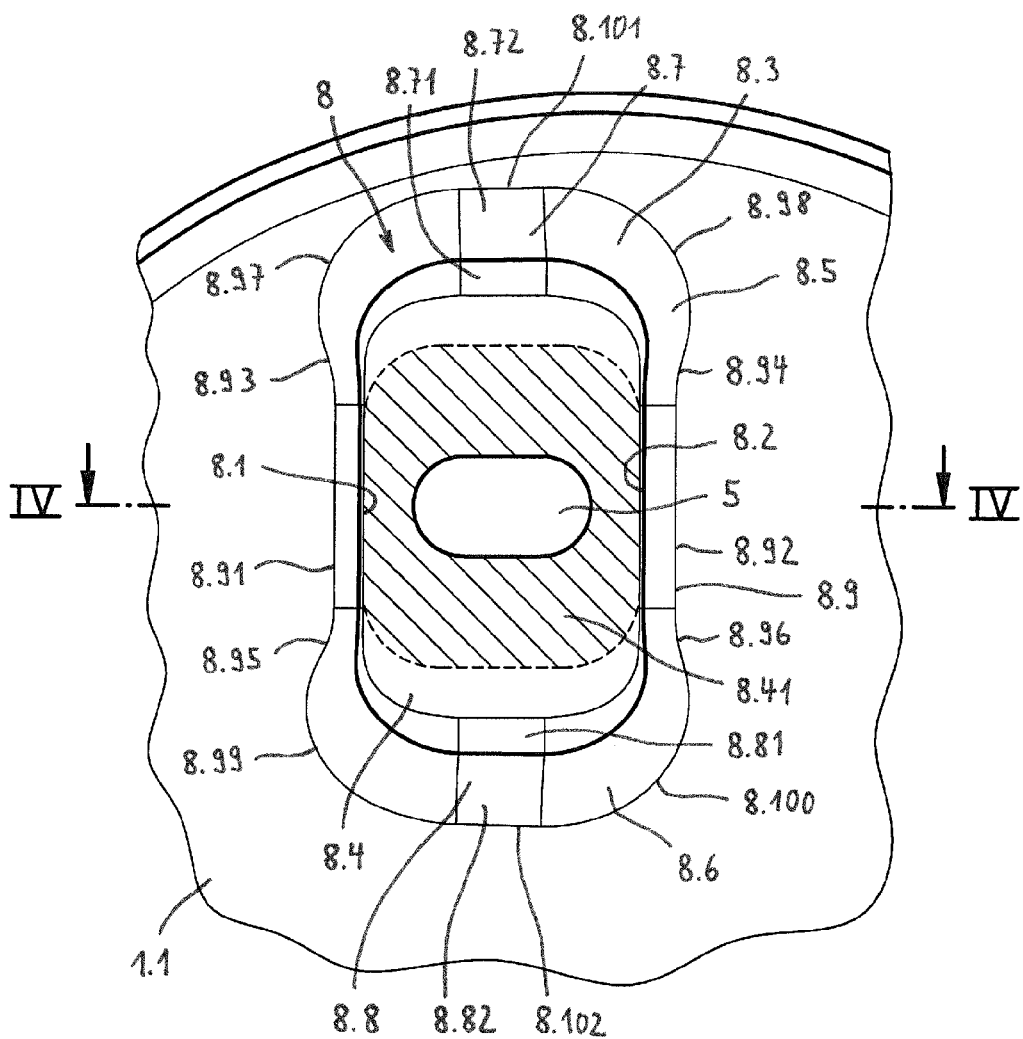
FIG. 3 is a front view of a detail of the rear axle beam of FIG. 1 comprising an eccentric disc stop according to the invention without connection bolt and without an eccentric disc.

The recess 8 defines a peripheral edge region 8.3 and a base 8.4 enclosed by the edge region 8.3. The slot 5 is formed after the recess 8 has been moulded into the base 8.4. The base 8.4 is preferably formed in a substantially planar manner. The surface 8.41, shown by hatching in FIG. 3, of the base 8.4 of the recess is the surface region which is available to the eccentric disc 7 connected to the connection bolt 6 as the adjustment region when the eccentric adjusting of the connection bolt 6 is performed. Said adjustment region (surface region) 8.41 can also be referred to as a functional surface.

Figure 4:
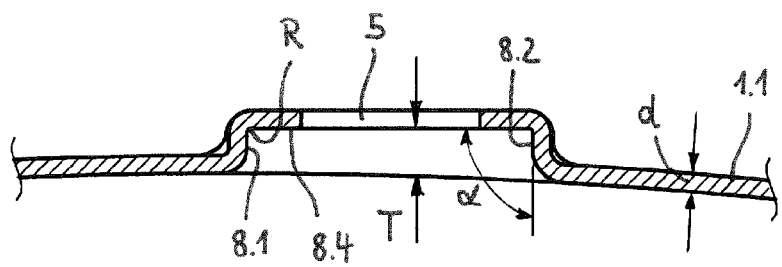
FIG. 4 is a sectional view of the eccentric disc stop according to the invention, along the line IV-IV in FIG. 3.
Figure 5:
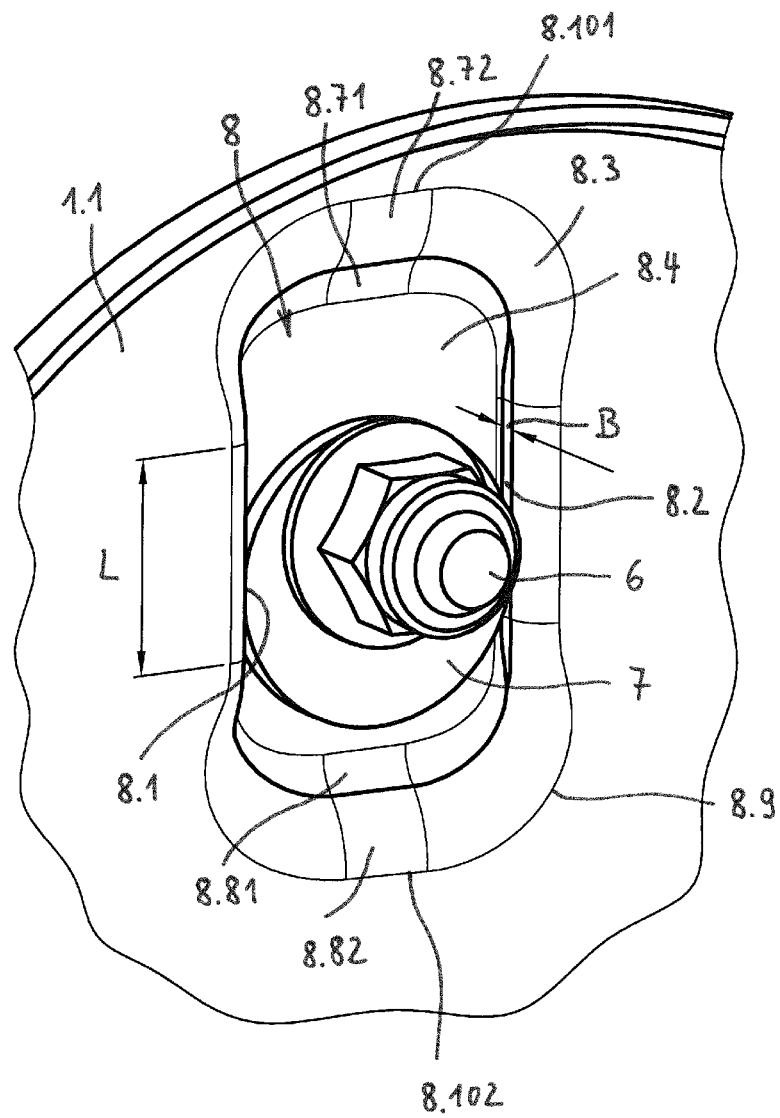
FIG. 5 is a perspective view of a detail of the rear axle beam according to FIG. 3 comprising the eccentric disc stop according to the invention and a connection bolt provided with an eccentric disc.

The two oblong surfaces (stop surfaces) 8.1, 8.2, extending in parallel with one another, enclose an angle α with the base 8.4 which is preferably approximately 90°. The two surfaces 8.1, 8.2 are each approximately rectangular in shape. The length L thereof is preferably greater than the length of the slot 5. More preferably, the length L of each surface (eccentric disc stop surface) 8.1, 8.2 is more than 1.1 times the length of the slot 5 (cf. FIGS. 3 and 5). In particular, the length L of the stop surfaces 8.1, 8.2 is determined by the required adjustment path for setting the track or camber, and by the diameter of the eccentric disc. Viewed perpendicularly to its length L, each surface 8.1, 8.2 extends over more than 10%, preferably more than 20%, more preferably more than 25% of the depth T of the recess 8 (cf. FIG. 4). The corresponding width (depth) of the surface 8.1, 8.2 is denoted with the reference sign B in FIG. 5.

The transition radius R, with which the surfaces 8.1, 8.2 transition into the base 8.4 of the recess, can have very small dimensions. It is, for example, less than 1.0 mm, preferably less than 0.6 mm.

Furthermore, the peripheral edge region 8.3 of the recess 8 comprises two arcuate edge portions 8.5, 8.6 which transition into the substantially straight surfaces 8.1, 8.2 extending in parallel with one another and comprise curved flanks 8.7, 8.8 in a sectional plane extending perpendicularly to the longitudinal axis of the slot 5. It can clearly be seen in FIGS. 3 and 5 that each flank 8.7, 8.8 comprises a concave flank portion 8.71, 8.81 beginning at the base 8.4 of the recess and a convex flank portion 8.72, 8.82 connected thereto and ending at the outer peripheral line 8.9 of the peripheral edge region 8.3. It can be seen in particular that the outer peripheral line 8.9 of the recess 8 comprises peripheral line portions 8.91, 8.92 which extend in parallel with one another and extend in parallel with the surfaces 8.1, 8.2. The length of said substantially straight peripheral line portions 8.91, 8.92 corresponds at least to the length L of the surfaces 8.1, 8.2. The peripheral line portions 8.91, 8.92 transition into arcuate peripheral line portions 8.93, 8.94. Said arcuate portions extend from the straight peripheral line portions 8.91, 8.92 so as to initially diverge from one another, and change their curve direction following a curve length, the length of which is approximately the same as the shortest distance between the semi-circular hole edge of the slot 5 and the straight surface 8.1, 8.2. The arcuate peripheral line portions 8.87, 8.98, 8.99, 8.100, which continuously approach one another, meet in a straight or approximately straight peripheral line portion 8.101 or 8.102, which extends substantially perpendicularly to the straight peripheral line portions 8.91, 8.92 or in parallel with the longitudinal axis of the slot 5. The recess 8 thus has two distance enlargements (inner diameter enlargements) at the arcuate edge portions 8.5, 8.6 compared with the distance between the straight surfaces 8.1, 8.2 or the straight peripheral line portions 8.91, 8.92.

The convex flank portion 8.72, 8.82 has a significantly greater curve length than the concave flank portion 8.71, 8.81. It can be clearly seen in FIGS. 3 and 5 that the convex flank portion 8.72, 8.82 ending at the outer peripheral line 8.9 has a curve length which is more than approximately 80% longer than that of the concave flank portion 8.71, 8.81 beginning at the base 8.4 of the recess. In addition, it can be seen that the concave flank portion 8.71, 8.81 begins at a distance from the longitudinal axis of the slot 5 which is greater than the length of the slot 5. The distance between the concave flank portion 8.71 or 8.81 and the adjustment region 8.41 (functional surface) is approximately half the smallest diameter (or the width) of the slot 5.

Of course, the use of the invention is not limited to rear axle beams. Rather, it can also be used in front axle beams.

The invention claimed is:

1. A chassis component having a mount which is produced from a formable basic material, comprising at least one slot for receiving a connection bolt for connecting a steering arm and at least one stop for an eccentric disc which is or can be connected in a torsionally stiff sense to the connection bolt, wherein a recess is moulded into the basic material and defines a peripheral edge region and a base enclosed by the edge region, the base comprising the slot and the edge region comprising two oblong surfaces which extend in parallel with one another and act as the stop for the eccentric disc, wherein the eccentric disc is rotatable within the recess.

2. The chassis component according to claim 1, wherein each of the two oblong surfaces, which extend in parallel with one another, enclose an angle with the base which is in the range of from 90° to 120°.

3. The chassis component according to claim 1, wherein each of the two oblong surfaces, extending in parallel with one another, extend over at least 10% of the depth of the recess.

4. The chassis component according to claim 1, wherein the greatest depth of the recess is less than 3.0 times the thickness of the basic material.

5. The chassis component according to claim 1, wherein each of the two oblong surfaces, extending in parallel with one another, has a length which is at least 0.8 times the length of the slot.

6. The chassis component according to claim 1, wherein each of the two oblong surfaces extending in parallel with one another transitions into the base of the recess with a transition radius of less than 1.0 mm.

7. The chassis component according to claim 1, wherein the peripheral edge region comprises two arcuate edge regions which transition into the two oblong surfaces extending in parallel with one another and comprise curved flanks in a sectional plane extending perpendicularly to the longitudinal axis of the slot, each of the flanks comprising a concave flank portion beginning at the base of the recess and a convex flank portion connected thereto and ending at the outer peripheral line of the peripheral edge region.

8. The chassis component according to claim 7, wherein the convex flank portion has a curve length which is at least 20% longer than that of the concave flank portion.

9. The chassis component according to claim 7, wherein the concave flank portion begins at a distance from the longitudinal axis of the slot which is greater than the length of the slot.

10. The chassis component according to claim 1, wherein each of the two oblong surfaces, extending in parallel with one another, extend over at least 20% of the depth of the recess.

11. The chassis component according to claim 1, wherein each of the two oblong surfaces, extending in parallel with one another, extend over at least 25% of the depth of the recess.

12. The chassis component according to claim 1, wherein the greatest depth of the recess is less than 2.8 times the thickness of the basic material.

13. The chassis component according to claim 1, wherein each of the two oblong surfaces, extending in parallel with one another, has a length which is at least 1.1 times the length of the slot.

14. The chassis component according to claim 1, wherein each of the two oblong surfaces extending in parallel with one another transitions into the base of the recess with a transition radius of less than 0.6 mm.

15. The chassis component according to claim 1, wherein the eccentric disc has an annular shape.

16. A chassis component having a mount which is produced from a formable basic material, comprising at least one slot for receiving a connection bolt for connecting a steering arm and at least one stop for an eccentric disc which is or can be connected in a torsionally stiff sense to the connection bolt, wherein a recess is moulded into the basic material and defines a peripheral edge region and a base enclosed by the edge region, the base comprising the slot and the edge region comprising two oblong surfaces which extend in parallel with one another and act as the stop for the eccentric disc, wherein the peripheral edge region comprises two arcuate edge regions which transition into the two oblong surfaces extending in parallel with one another and comprise curved flanks in a sectional plane extending perpendicularly to the longitudinal axis of the slot, each of the flanks comprising a concave flank portion beginning at the base of the recess and a convex flank portion connected thereto and ending at the outer peripheral line of the peripheral edge region.

17. The chassis component according to claim 16, wherein the convex flank portion has a curve length which is at least 20% longer than that of the concave flank portion.

18. The chassis component according to claim 16, wherein the concave flank portion begins at a distance from the longitudinal axis of the slot which is greater than the length of the slot.

* * * * *